United States Patent
Mizukami

(10) Patent No.: US 7,108,112 B2
(45) Date of Patent: Sep. 19, 2006

(54) DAMPER MECHANISM FOR A LOCKUP CLUTCH

(75) Inventor: Hiroshi Mizukami, Neyagawa (JP)

(73) Assignee: Exedy Corporation, Osaka (JP)

( * ) Notice: Subject to any disclaimer, the term of this patent is extended or adjusted under 35 U.S.C. 154(b) by 79 days.

(21) Appl. No.: 10/898,203

(22) Filed: Jul. 26, 2004

(65) Prior Publication Data

US 2005/0023103 A1    Feb. 3, 2005

(30) Foreign Application Priority Data

Aug. 1, 2003    (JP)    ............................. 2003-284659

(51) Int. Cl.
    *F16H 45/02*    (2006.01)
(52) U.S. Cl. ............. 192/3.29; 192/203; 192/205; 192/213.2; 464/68.1; 464/68.92
(58) Field of Classification Search ............. 192/213.2, 192/203; 464/68.1, 68.9
    See application file for complete search history.

(56) References Cited

U.S. PATENT DOCUMENTS

| | | | | |
|---|---|---|---|---|
| 4,987,980 | A * | 1/1991 | Fujimoto | ............... 192/213.2 |
| 5,052,664 | A | 10/1991 | Lesher et al. | |
| 5,090,945 | A | 2/1992 | Graton et al. | |
| 5,246,399 | A * | 9/1993 | Yanko et al. | ............... 464/67.1 |
| 5,769,722 | A | 6/1998 | Uehara | |
| 6,202,810 | B1 * | 3/2001 | Yamaguchi et al. | ........ 192/3.29 |
| 6,241,614 | B1 * | 6/2001 | Mizukami et al. | .......... 464/68.1 |
| 6,461,243 | B1 * | 10/2002 | Uehara | ..................... 464/68.92 |
| 2002/0039926 | A1 * | 4/2002 | Uehara | ......................... 464/68 |

FOREIGN PATENT DOCUMENTS

| | | | |
|---|---|---|---|
| JP | 59-75922 | | 5/1984 |
| JP | 61-52423 | A | 3/1986 |
| JP | 62-4630 | U1 | 1/1987 |
| JP | 3-282043 | A * | 12/1991 |
| JP | 5-45257 | | 6/1993 |
| JP | 8-254246 | | 10/1996 |
| JP | 2000-505870 | A | 5/2000 |
| JP | 2000-179654 | A | 6/2000 |
| JP | 2003-202035 | A | 7/2003 |

* cited by examiner

Primary Examiner—Rodney H. Bonck
(74) Attorney, Agent, or Firm—Global IP Counselors, LLP

(57) ABSTRACT

A damper mechanism for a lockup device 7 is a device for mechanically transmitting a torque in a torque converter 1. A coil spring 58 is arranged in first and second windows 61 and 62 overlapping with each other, and is compressed in accordance with the relative rotation of drive and driven members 52 and 53. A maximum torsion angle $\theta$ m is defined when the coil springs 58 are compressed to a maximum extent by relative rotation between the drive and driven members 52 and 53. Each of the first and second windows 61 and 62 has an outer periphery longer than an inner periphery. Each ends 61a and 62a on the circumferential ends of the first and second windows 61 and 62 form an angle $\theta$ with respect to a center line extending through a center O of the damper mechanism and a circumferential center C1 or C2 of the first or second window 61 or 62, and this angle $\theta$ is in a range between 0.05 and 0.60 times as large as the maximum torsion angle $\theta$ m.

10 Claims, 4 Drawing Sheets

DAMPER MECHANISM FOR A LOCKUP CLUTCH

BACKGROUND OF THE INVENTION

1. Field of the Invention

The present invention relates to a damper mechanism, and more particularly to a damper mechanism for a lockup device.

2. Background Information

A damper mechanism is used, for example, in a power transmission system for transmitting torque while absorbing and damping torsional vibrations. The damper mechanism includes a first rotary member, a second rotary member, and springs or elastic bodies, which will be generally referred to as "elastic members" hereinafter. These elastic members are arranged between the first and second rotary members, and are compressed when relative rotation occurs between these members. The springs may be formed of coil springs. The elastic bodies may be made of rubber or resin. The damper mechanism is employed in a clutch disk assembly, a flywheel assembly or a lockup device of a torque converter, as disclosed, for example, in Japanese Laid-Open Patent Publication No. H8-254246

The elastic members are arranged in windows formed in the first and second rotary members. When relative rotation occurs between the first and second rotary members, the radial ends of the window (i.e., the ends that extend nearly radially on the circumferential ends of the window) circumferentially compress the elastic members. Thereby, the damper mechanism transmits a torque from the first rotary member to the second rotary member, and also operates to absorb and damp torsional vibrations.

In general, each radial end on the circumferential ends of the window has a linear form, and is parallel to a straight line extending between the center of the damper and the circumferential center of the window. When relative rotation occurs between the first and second rotary members, the circumferential end portion of the window moves such that the radially outer portion thereof moves a longer distance than the radially inner portion thereof (see FIG. 4). In FIG. 4, O represents the rotational center of the rotary member, C represents the circumferential center of the window, and $\theta$ m represents the angle of relative rotation between the first and second rotary members in a state where the elastic members are compressed to a maximum extent. Thus, the elastic members are compressed by the radial ends of the windows such that the radially outer portion of the elastic members are compressed to a larger extent than the radially inner portion thereof. Accordingly, a larger stress occurs in the radially inner portion of the elastic members due to the larger deformation of the radially outer portions thereof. This reduces the lifetime of the elastic members.

In order to prevent the above situation, the radial ends of the windows are inclined relative to a straight line extending through the center of the damper and the circumferential center of the window so that the window has a substantially trapezoidal form. Thus, the circumferentially opposite ends of the radially outer periphery of the window are respectively located circumferentially outside (i.e., outside in the rotational direction of the damper) with respect to the circumferentially opposite ends of the radially inner periphery. This window shape can suppress an increase in the amount of deformation of the radially outer portion which occurs when the elastic members are compressed.

However, if the radial ends of the windows are inclined excessively, only the radially inner portion of the elastic members will come into contact with a window ends when relative rotation starts between the first and second rotary members, and thus a radially outward force (i.e., a force in a lateral direction of the elastic members) will be applied to the elastic members. If the elastic members have a low rigidity against the radially outward force, they will be deformed. This causes contact between the elastic members and the window ends, and thus increases hysteresis torque and wear on the elastic members.

More particularly, in a lockup device of a hydraulic torque transmission device such as a torque converter, the damper mechanism has been required to have elastic members which have a low rigidity and which allow a large torsional angle for absorbing vibrations. Therefore, elastic members such as coil springs having a larger circumferential length and a lower rigidity have been employed. Therefore, it is thought that that the foregoing problem will be more remarkable in a damper mechanism for a lockup device.

In view of the above, there exists a need for a damper mechanism for a lockup device which overcomes the above mentioned problems in the prior art and which can increase the lifetime of the elastic members used therein. This invention addresses this need in the prior art as well as other needs, which will become apparent to those skilled in the art from this disclosure.

SUMMARY OF THE INVENTION

According to a first aspect of the invention, a damper mechanism for a lockup device which serves to mechanically transmit torque in a hydraulic torque transmission device includes a first rotary member, a second rotary member and a plurality of elastic members. The first rotary member has a plurality of first windows aligned in a rotational direction. The second rotary member has a plurality of second windows overlapping with the first windows, and is rotatable relative to the first rotary member. The elastic members are arranged in the first and second windows overlapping with each other, and are compressed in the rotational direction in accordance with relative rotation between the first and second rotary members. A maximum torsion angle $\theta$ m is formed between the first and second rotary members when they are rotated relative to each other to compress the elastic members to a maximum extent. Each of the first and second windows has a radially outer periphery longer than a radially inner periphery. An angle $\theta$ formed by each of radial ends of the first and second windows with respect to a straight line extending through a center of the damper mechanism and the circumferential center of the first or second window is in a range between 0.05 and 0.60 times as large as the maximum torsion angle $\theta$ m.

With the damper mechanism for the lockup device described above, the radial ends on the circumferentially opposite ends of each of the first and second windows are inclined with respect to a straight line which extends through the center of the damper mechanism and the circumferential center of the first or second window, and will be referred to as a "center line" hereinafter. The angle $\theta$ between this center line and the radial ends is 0.05 to 0.60 times as large as the maximum torsion angle $\theta$ m, which is the torsion angle defined between the first and second rotary members when the first and second windows compress the elastic members to the maximum extent. Because the angle $\theta$ is in the foregoing range with respect to $\theta$ m, the force that pushes the elastic members radially outward can be suppressed, and an increase in the amount of compression of the radially outer portion of the elastic members can be suppressed. This can extend the lifetime of the elastic members.

According to a second aspect of the present invention, the angle θ is in a range between 0.10 and 0.45 times as large as the angle θ m.

With this damper mechanism for a lockup device, because the angle θ is in the aforementioned range with respect to the angle θ m, the force that pushes the elastic members radially outward can be suppressed, and an increase in the amount of compression of the radially outer portion of the elastic members can be suppressed. This can extend the lifetime of the elastic members.

According to a third aspect of the present invention, the angle θ is in a range between 0.20 and 0.40 times as large as the angle θ m.

With this damper mechanism for a lockup device, because the angle θ is in the aforementioned range with respect to the angle θ m, the force that pushes the elastic members radially outward can be suppressed, and an increase in the amount of compression of the radially outer portion of the elastic members can be suppressed. This can extend the lifetime of the elastic members.

According to a fourth aspect of the present invention, the elastic members are coil springs that are each composed of a wire that extends in a spiral shape, and each coil spring has a free length that is at least 3.0 times longer than a coil diameter.

With this damper mechanism for a lockup device, the coil spring has a relatively elongated shape. This type of coil spring is liable to be deformed by a force acting perpendicular to a longitudinal direction of the coil. Therefore, the elastic members are vulnerable to a radially outward force. However, because the angle θ of the radial ends of the first and second windows is appropriately set with respect to the angle θ m, an increase in hysteresis torque and wear can be suppressed even in a structure employing elastic members formed of relatively long coil springs.

According to the damper mechanism for a lockup device of the present invention, elastic members can have an increased lifetime by appropriately setting the size of the angle θ with respect to the angle θ m.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

1. Structure of the Torque Converter

Figure 1:
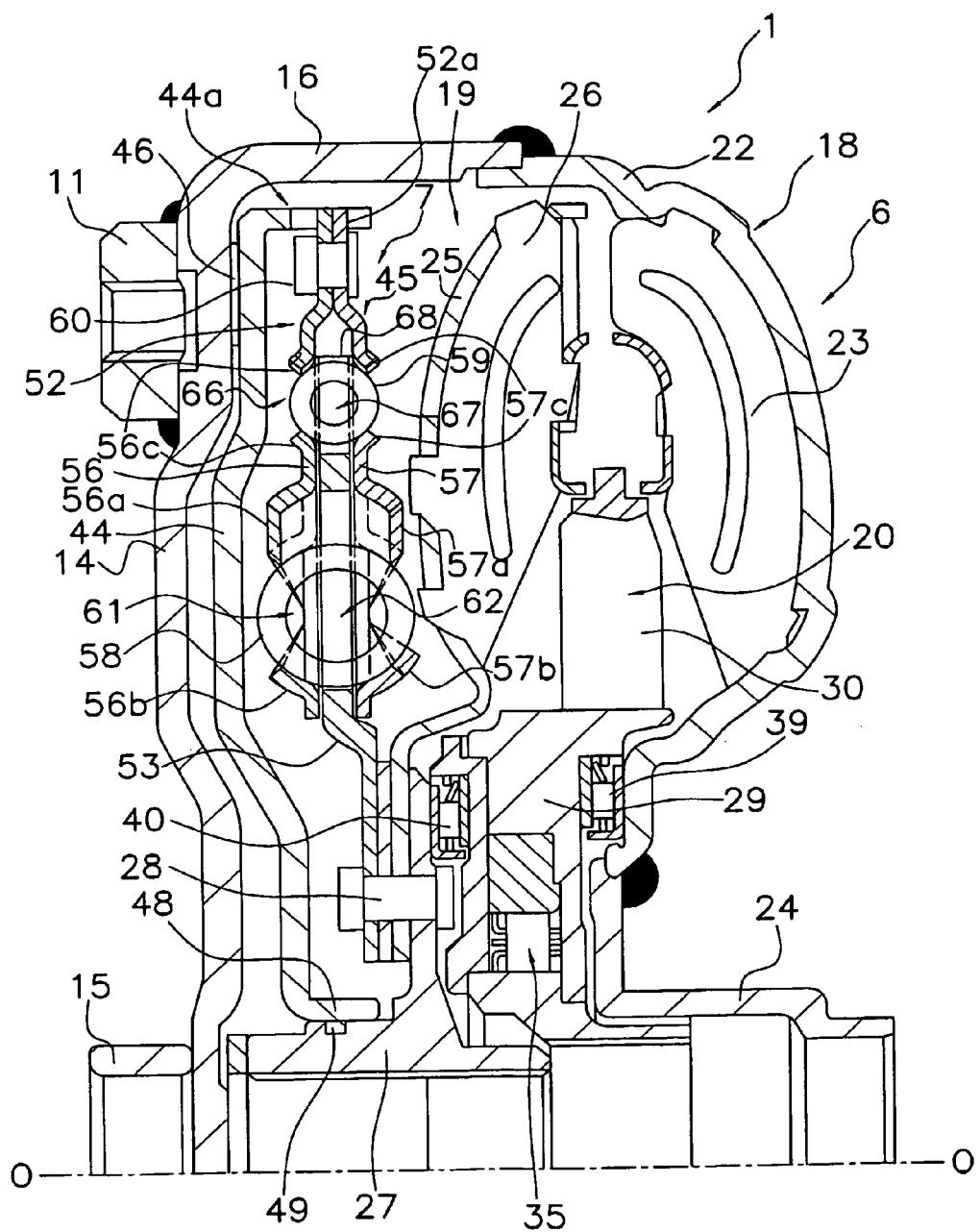
FIG. 1 is a cross sectional view of a torque converter according to the present invention.

FIG. 1 shows a schematic cross section of a torque converter 1 employing an embodiment of the present invention. The torque converter 1 is a device for transmitting torque from a crankshaft (not shown) of an engine to an input shaft (not shown) of a transmission. Although not shown, the engine is arranged on the left side of FIG. 1, and the transmission is arranged on the right side of FIG. 1. In FIG. 1, O—O represents a rotation axis of the torque converter 1.

The torque converter 1 primarily includes a torus 6 which is formed of three kinds of vane wheels (i.e., an impeller 18, a turbine 19 and a stator 20), and a lockup device 7.

A front cover 14 is a circular disk-like member, and is arranged near the end of the crankshaft of the engine. A center boss 15 is welded to a radially inner portion of the front cover 14. A plurality of nuts 11, which are equally spaced from each other in the rotational direction (i.e., the circumferential direction), are fixed to an engine-side surface (i.e., a surface opposed to the engine) of a radially outer portion of the front cover 14.

The front cover 14 is provided at its radially outer portion with a radially outer cylindrical portion 16 extending axially toward the transmission. An outer periphery of an impeller shell 22 of the impeller 18 is welded to the end of the outer cylindrical portion 16. Consequently, the front cover 14 and the impeller 18 form a fluid chamber filled with a working fluid. The impeller 18 is primarily formed of the impeller shell 22, a plurality of impeller blades 23 fixed to an inner side of the impeller shell 22, and an impeller hub 24 fixed to the inner periphery of the impeller shell 22.

The turbine 19 is located in the fluid chamber, and is axially opposed to the impeller 18. The turbine 19 is primarily formed of a turbine shell 25, and a plurality of turbine blades 26 fixed to a surface on the impeller side of the turbine shell 25. A radially inner portion of the turbine shell 25 is fixed to a flange of a turbine hub 27 by a plurality of rivets 28.

The turbine hub 27 is non-rotatably coupled to the input shaft of the transmission (not shown).

The stator 20 is a mechanism for regulating the flow of the working fluid returning from the turbine 19 to the impeller 18. The stator 20 is an integral member produced by molding resin, aluminum alloy or the like. The stator 20 is arranged between radially inner portions of the impeller 18 and turbine 19. The stator 20 is primarily formed of an annular carrier 29 and a plurality of stator blades 30 arranged on an outer peripheral surface of the carrier 29. The carrier 29 is supported on a fixed shaft (not shown) via a one-way clutch 35.

A thrust bearing 39 is arranged between the impeller hub 24 and the carrier 29. A thrust bearing 40 is arranged between the carrier 29 and the turbine hub 27. The structure allows the carrier 29 to rotate relative to each of the hubs 24 and 27 while maintaining a predetermined space.

2. Lockup Device

The lockup device 7 will now be described.

The lockup device 7 is primarily formed of a piston member 44 and a damper disk assembly 45.

The piston member 44 is a circular disk-like member, and is disposed near the transmission side of the front cover 14 in the axial direction. The piston member 44 is provided at its radially inner portion with a radially inner cylindrical portion 48 extending axially toward the transmission. The inner cylindrical portion 48 is relatively rotatable with respect to the outer peripheral surface of the turbine hub 27, and is axially movably supported thereby. The inner cylindrical portion 48 can axially move only to a predetermined position on the transmission side, in which an axial end on the transmission side of the inner cylindrical portion 48 comes into contact with the flange of the turbine hub 27. A seal ring 49 is arranged on the outer peripheral surface of the turbine hub 27 for axially sealing a portion radially inside the piston member 44.

An annular friction facing 46 is fixed to an engine-side surface of the radially outer portion of the piston member 44. The friction facing 46 is opposed to an annular flat friction surface formed on an inner surface of the radially outer portion of the front cover 14. The piston member 44 is provided at its radially outer portion with a cylindrical portion 44a extending axially toward the transmission, and the cylindrical portion 44a is provided with a plurality of slots which are angularly equally spaced from each other.

Figure 2:
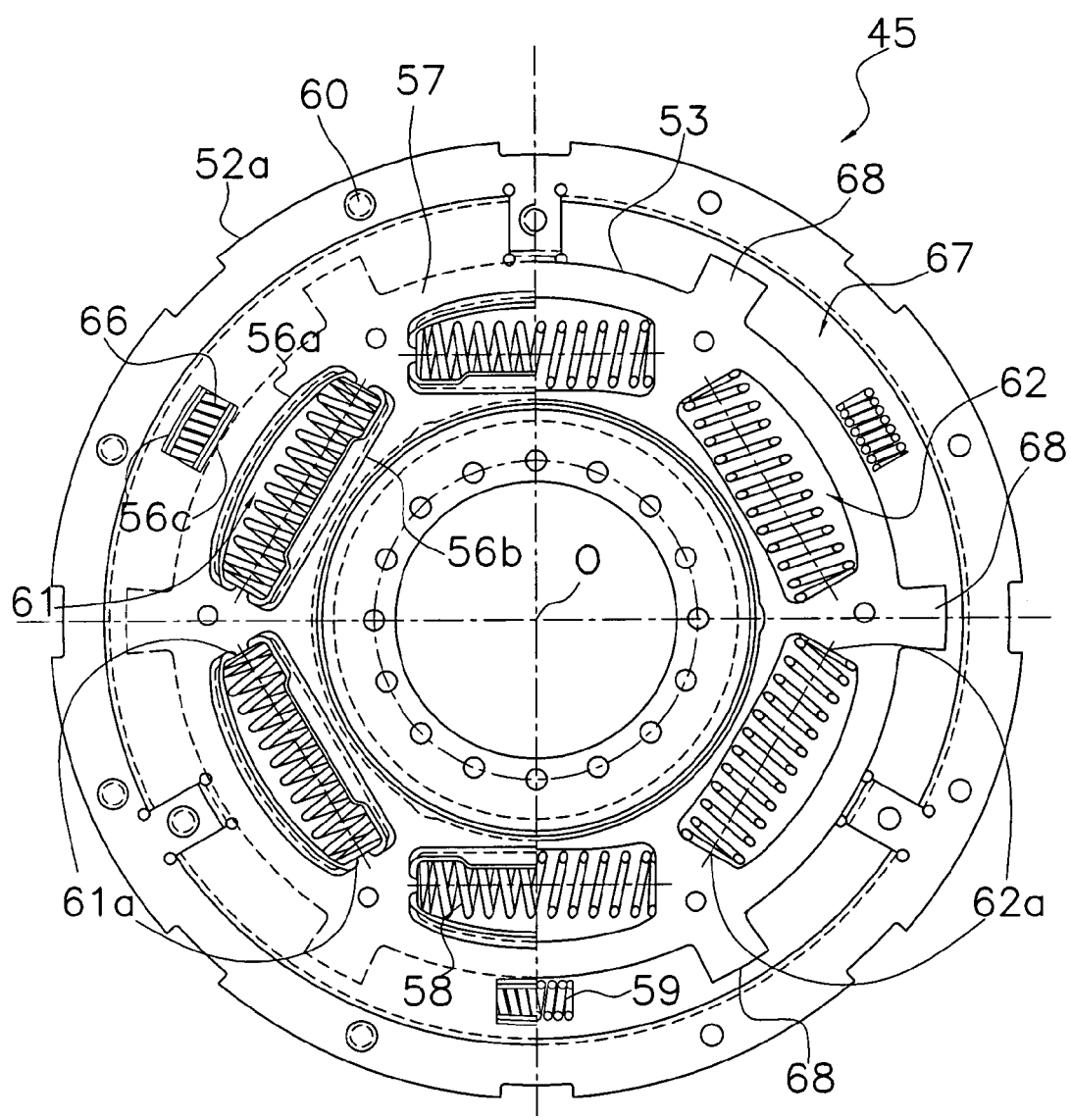
FIG. 2 is a plan view of a lockup device according to the present invention.

The damper disk assembly 45 is a device for elastically coupling the piston member 44 to the turbine 19 in the rotational direction, and functions to transmit torque from the piston member 44 to the turbine 19 and absorbing torsional vibrations. The damper disk assembly 45 is formed of a drive member 52 that is primarily formed of a pair of plate members 56 and 57, a driven member 53, and a plurality of coil springs 58 and 59. Note that in FIG. 2, the damper disk assembly 45 is shown with the portion of the plate member 57 to the left of the dotted and dashed line removed.

The pair of plate members 56 and 57 forming the drive member 52 are annular disk-like members, and are aligned in the axial direction, i.e., along the rotation axis. The radially outer portions of plate members 56 and 57 are fixed together by a plurality of rivets 60, and the radially inner portions thereof are spaced apart from each other. The drive member 52 has a plurality of radially outward projections. The projections are engaged with the slots formed in the cylindrical portion 44a of the piston member 44, and provide a torque input portion receiving the torque from the piston member 44. The engagement allows the piston member 44 and the drive member 52 to move relative to each other in the axial direction, and rotate together in the rotational direction.

The pair of plate members 56 and 57 forming the drive member 52 are provided with a plurality of cut and bent portions 56a and 56b or cut and bent portions 57a and 57b at six circumferential equally spaced angular positions in their central portions thereof. These cut and bent portions 56a, 56b, 57a and 57b surround recesses forming first windows 61 in the drive member 52. The cut and bent portions 56a and 57a define the radially outer end of the first window 61, and the cut and bent portions 56b and 57b define the radially inner end of the first window 61. Each of the cut and bent portions 56b and 57b has a circumferentially central portion, which is cut and bent to a larger extent than its circumferentially opposite end portions. Each of the plate members 56 and 57 is provided at its radially outer portion with three second cut and bent portions 56c or 57c, which are circumferentially equally spaced from each other. These second cut and bent portions 56c and 57c form small windows 66.

The driven member 53 is an annular disk-like member, and is arranged axially between radially inner portions of the paired plate members 56 and 57. The driven member 53 is fixed to the turbine hub 27 by the rivets 28. Thereby, the driven member 53 and the turbine hub 27 rotate together.

The driven member 53 is provided at its central portion with second windows 62, which correspond to the first windows 61 in the drive member 52, respectively, and each has a shape similar to that of the first window 61. The driven member 53 is provided at its outer periphery with a plurality of projections 68 to form spaces 67, which are located in the positions corresponding to the small windows 66 in the drive member 52, respectively.

The plurality of coil springs 58 is accommodated in the first and second windows 61 and 62. Each coil spring 58 extends in the rotational direction, and has a relative low rigidity. The coil spring 58 has a shape that is elongated in the rotational direction, and has a free length three or more times longer than the coil diameter. The coil spring 58 has a free length substantially equal to the circumferential lengths of the first and second windows 61 and 62. The circumferentially opposite ends (i.e., the opposite ends in the rotational direction) of each coil spring 58 are carried by radial ends 61a and 62a on the circumferential ends of the first and second windows 61 and 62. The cut and bent portions 56a, 56b, 57a and 57b restrict the axial movement of the coil springs 58. When the drive member 52 rotates relative to the driven member 53, the coil springs 58 are compressed and deformed between the circumferential ends of the first and second windows 61 and 62.

Figure 3:
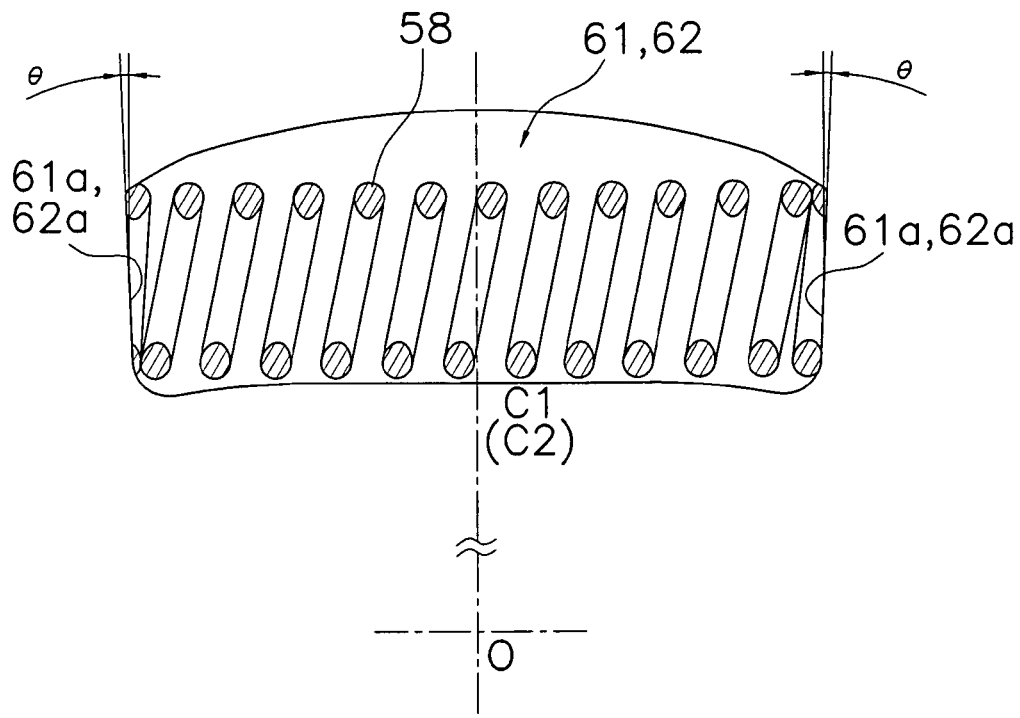
FIG. 3 shows the shape of first and second windows according to the present invention.
Figure 4:
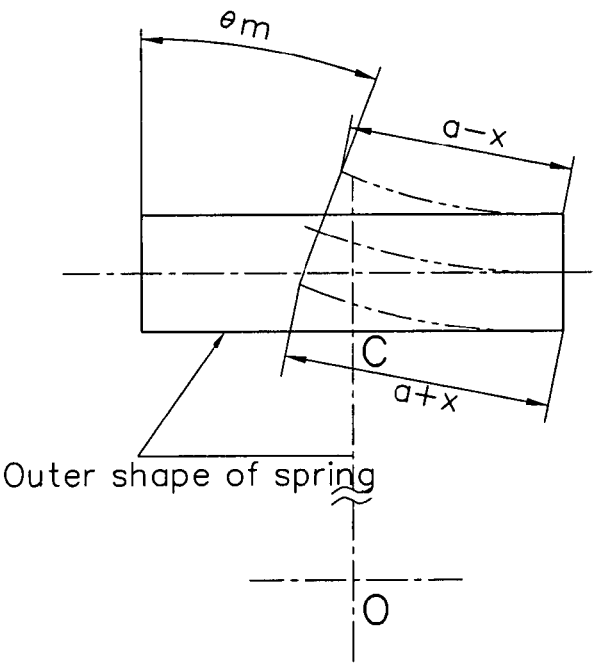
FIG. 4 is a schematic view showing an example of a conventional window shape having opposite ends that are parallel to each other.
Figure 5:
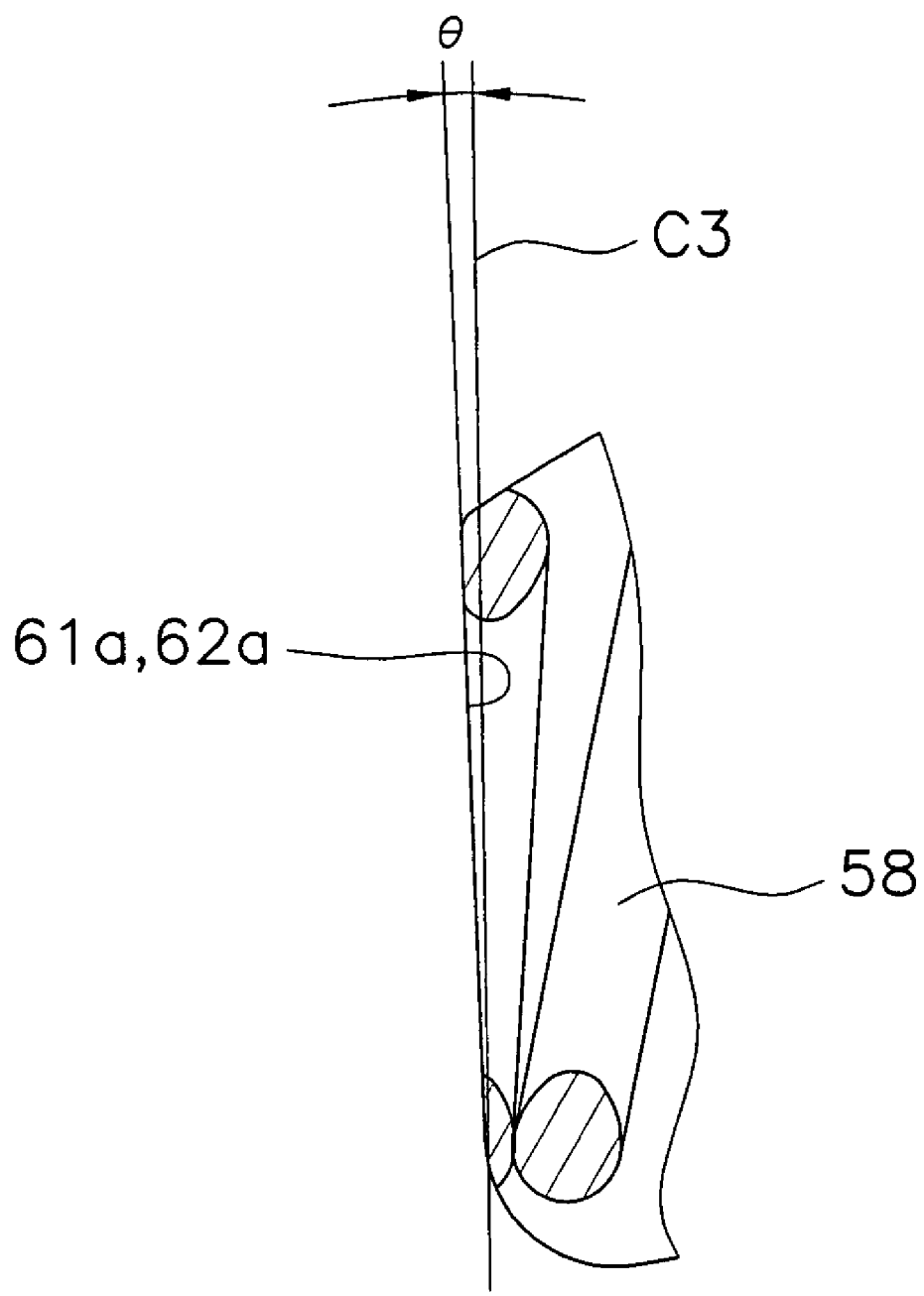
FIG. 5 is an enlarged view of FIG. 3.

Each of the radial ends 61a and 62a of the first and second windows 61 and 62 forms a predetermined angle θ with respect to a line C3, as shown in FIG. 5, which extends between the center C1 or C2 of the corresponding first or second window 61 or 62 and the rotation center O, and will be referred to as a "center line" hereinafter (see FIG. 3). Consequently, each of the first and second windows 61 and 62 has a trapezoidal shape or a sector shape. Thus, the circumferentially opposite ends of the outer periphery of each of the first and second windows 61 and 62 are located circumferentially outside the circumferentially opposite ends of the inner periphery thereof.

Further, the coil springs 58 in the free state each have circumferential ends which are shaped to be complementary to the shape of the radial ends 61a and 62a on the circumferential ends of the first and second windows 61 and 62. Therefore, the circumferentially opposite ends of each coil spring 58 are in contact with or close to the radial ends 61a and 62a of the first and second windows 61 and 62, but do not apply a load thereto. This suppresses wear on the radial ends 61a and 62a of the first and second windows 61 and 62 as well as the wear on the coil springs 58.

It is assumed that a maximum torsion angle θ m is formed between the drive and driven members 52 and 53 when the coil springs 58 are compressed to the maximum extent in accordance with a relative rotation between the drive and driven members 52 and 53. The above angle θ is in a range between 0.05 and 0.60 times as large as the maximum torsion angle θ m. The angle θ is preferably in a range between 0.10 and 0.45 times as large as the maximum torsion angle θ m, and is further preferably in a range between 0.20 and 0.40 times as large as the maximum torsion angle θ m.

The coil springs 59 are accommodated in the small windows 66 and the spaces 67. Each coil spring 59 has a free length substantially equal to a circumferential length of the small window 66. The circumferentially opposite ends of each coil spring 59 are carried by the circumferential ends of the second cut and bent portions 56c and 57c. The second cut and bent portions 56c and 57c restrict the axial movement of the coil springs 59. Since the length of each coil spring 59 is shorter than the space between the projections 68, the projections 68 and the second cut and bent portions 56c and 57c compress the coil springs 59 when the drive member 52 rotates relatively to the driven member 53 to a large extent.

3. Operation

The torque of the engine (not shown) is transmitted from the crankshaft (not shown) to the front cover 14 and the impeller 18. The impeller blades 23 of the impeller 18 drive the working fluid to rotate the turbine 19. The torque of turbine 19 is output to the input shaft of the transmission (not shown) via the turbine hub 27. The working fluid flowing from the turbine 19 to the impeller 18 flows through a passage of the stator 20 toward the impeller 18.

When the working fluid in the space between the front cover 14 and the piston member 44 drains radially inward, a difference in hydraulic pressure moves the piston member 44 of the lockup device 7 toward the front cover 14 (i.e., axially toward the engine) so that the friction facing 46 is pressed against the friction surface of the front cover 14. Consequently, the torque is transmitted from the front cover 14 to the turbine hub 27 via the lockup device 7.

When the lockup device 7 is transmitting torque, the drive member 52 rotates relative to the driven member 53, and thereby compresses the coil springs 58 to absorb the torsional vibrations. When the drive member 52 and the driven member 53 relatively rotate to a large extent, the coil springs 59 are compressed in addition to the coil springs 58.

With this torque converter 1 of the aforementioned embodiment, the lifetime of the coil springs 58 can be increased because of the shape of first and second windows 61 and 62 of the drive and driven members 52 and 53. The coil springs 58 have a free length which is 3.2 or more times longer than the coil diameter, and therefore have a significantly low rigidity. Because of this, the coil springs 58 are weak with respect to forces applied in the lateral direction.

When the drive and driven members 52 and 53 rotate relative to each other, the coil spring 58 is compressed by the ends 61a and 62a on the circumferential ends of the first and second windows 61 and 62. Because the inclination angle $\theta$ of the radial ends 61a and 62a on the circumferential ends is equal to or larger than a predetermined value with respect to the maximum torsion angle $\theta$ m, when the coil spring 58 is compressed, it is possible to suppress the increase in amount of deformation of the radially outer portion of the coil springs 58 so that the stress due to such deformation can be suppressed.

Further, because the inclination angle $\theta$ of the radial ends 61a and 62a on the circumferential ends is equal to or smaller than a predetermined value with respect to the maximum torsion angle $\theta$ m, the force which pushes the coil springs 58 radially outward by means of the radial ends 61a and 62a (the force acting perpendicularly to the longitudinal direction of the coil spring 58) will be suppressed. Accordingly, even in a structure which employs coil springs 58 having a relatively elongated shape, it is possible to suppress hysteresis torque of the torque converter and wear on the elastic members.

4. Other Embodiments

The invention is not restricted to the foregoing embodiment, and various modifications and variations can be effected without departing from the spirit and scope of the invention.

For example, the structure of the lockup device is not restricted to the foregoing embodiment. Further, the invention can be applied not only to a torque converter but also to another hydraulic torque transmission device.

Any terms of degree used herein, such as "substantially", "about" and "approximately", mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2003-284659. The entire disclosure of Japanese Patent Application No. 2003-284659 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A damper mechanism for a lockup device which serves to mechanically transmit torque in a hydraulic torque transmission device, comprising:

a first rotary member having a plurality of first windows aligned in a rotational direction, said first rotary member being axially movably and rotationally fixedly connected to a piston;

a second rotary member having a plurality of second windows overlapping with said first windows, and rotatable relative to said first rotary member; and a plurality of elastic members being arranged in said overlapping first and second windows, and compressed in said rotational direction by relative rotation between said first and second rotary members, a maximum torsion angle $\theta$ m being defined between said first and second rotary members rotated relative to each other to compress said elastic members to a maximum extent, and each of said first and second windows having a radially outer periphery longer than a radially inner periphery, and an angle $\theta$ formed by each radial end of said first and second windows with respect to a straight line extending through a center of said damper mechanism and a circumferential center of said first or second window being in a range between 0.20 and 0.40 times as large as said maximum torsion angle $\theta$ m.

2. The damper mechanism of the lockup device according to claim 1, wherein each of said elastic members is a coil spring that is composed of a wire that extends in a spiral shape, and said coil spring has a free length that is at least 3.0 times longer than a coil diameter.

3. A damper mechanism of a lockup device which serves to mechanically transmit torque in a hydraulic torque transmission device, comprising:

a first rotary member having a plurality of first windows aligned in a rotational direction;

a second rotary member having a plurality of second windows overlapping with said first windows, and rotatable relative to said first rotary member; and a plurality of elastic members being arranged in said overlapping first and second windows, and compressed in said rotational direction by relative rotation between said first and second rotary members, a maximum torsion angle $\theta$ m being defined between said first and second rotary members rotated relative to each other to compress said elastic members to a maximum extent, and each of said first and second windows having a radially outer periphery longer than a radially inner periphery, and an angle θ formed by each radial end of said first and second windows with respect to a straight line extending through a center of said damper mechanism and a circumferential center of said first or second window being in a range between 0.20 and 0.40 times as large as said maximum torsion angle angle θ m.

4. The damper mechanism of the lockup device according to claim 3, wherein each of said elastic members is a coil spring that is composed of a wire that extends in a spiral shape, and said coil spring has a free length that is at least 3.0 times longer than a coil diameter.

5. A torque converter comprising:

a front cover;

an impeller being fixed to said front cover;

a turbine being axially arranged between said front cover and said impeller; and a lockup device being configured to connect said turbine to said front cover, said lockup device having a piston, and a damper disk assembly having a drive member having a plurality of first windows aligned in a rotational direction, a driven member having a plurality of second windows overlapping with said first windows, and being rotatable relative to said first rotary member, and a plurality of elastic members being arranged in said overlapping first and second windows, and compressed in said rotational direction by relative rotation between said first and second rotary members, a maximum torsion angle θ m being defined between said first and second rotary members rotated relative to each other to compress said elastic members to a maximum extent, and each of said first and second windows having a radially outer periphery longer than a radially inner periphery, and an angle θ formed by each radial end of said first and second windows with respect to a straight line extending through a center of said damper mechanism and a circumferential center of said first or second window being in a range between 0.20 and 0.40 times as large as said maximum torsion angle θ m.

6. The torque converter according to claim 5, wherein said drive member is axially movably and rotationally fixedly connected to a piston.

7. The torque converter according to claim 6, wherein said piston and said drive members connect at outer radial portions thereof.

8. The torque converter according to claim 7, wherein said drive member includes two plates that interpose the driven member.

9. The torque converter according to claim 6, wherein said drive member includes two plates that interpose the driven member.

10. The torque converter according to claim 6, wherein each of said elastic members is a coil spring that is composed of a wire that extends in a spiral shape; and said coil spring has a free length that is at least 3.0 times longer than a coil diameter.

* * * * *